(12) United States Patent
Heller et al.

(10) Patent No.: US 10,843,676 B2
(45) Date of Patent: Nov. 24, 2020

(54) COMPRESSED-AIR BRAKE ASSEMBLY FOR A RAIL VEHICLE

(71) Applicant: KNORR-BREMSE SYSTEME FÜR SCHIENENFAHRZEUGE GMBH, Munich (DE)

(72) Inventors: Martin Heller, Unterschleißheim (DE); Thomas Anton, Kirchseeon (DE); Jorg-Johannes Wach, Munich (DE); Michael Holz, Karlsfeld (DE); Matthias Cordes, Freising (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 144 days.

(21) Appl. No.: 15/127,283

(22) PCT Filed: Mar. 9, 2015

(86) PCT No.: PCT/EP2015/054799
§ 371 (c)(1),
(2) Date: Apr. 17, 2017

(87) PCT Pub. No.: WO2015/139978
PCT Pub. Date: Sep. 24, 2015

(65) Prior Publication Data
US 2017/0240157 A1    Aug. 24, 2017

(30) Foreign Application Priority Data
Mar. 20, 2014    (DE) .................. 10 2014 103 840

(51) Int. Cl.
*B60T 15/02*    (2006.01)
*B60T 17/22*    (2006.01)
(Continued)

(52) U.S. Cl.
CPC .......... *B60T 15/021* (2013.01); *B60T 13/365* (2013.01); *B60T 13/665* (2013.01); *B60T 17/228* (2013.01)

(58) Field of Classification Search
CPC .... B60T 15/021; B60T 17/228; B60T 13/365; B60T 13/665
See application file for complete search history.

(56) References Cited

U.S. PATENT DOCUMENTS 4,344,138 A * 8/1982 Frasier .................. B60T 8/1705
105/61
6,036,282 A * 3/2000 Clarke .................. B60T 13/665
303/7
(Continued)

FOREIGN PATENT DOCUMENTS

DE     102006044004 B3    9/2006
DE     102006018554 B3    1/2008
(Continued)

OTHER PUBLICATIONS

Search report for International Patent Application No. PCT/EP2015/054799, dated Nov. 16, 2015.

*Primary Examiner* — Xuan Lan Nguyen
(74) *Attorney, Agent, or Firm* — Barnes & Thornburg LLP

(57) ABSTRACT

A compressed-air brake assembly for a rail vehicle includes at least one brake cylinder for producing a pressing force for a friction brake, wherein at least one control valve forms a corresponding brake-cylinder pressure in accordance with a pressure in a main air line conducted to the at least one brake cylinder via a line arranged therebetween. The at least one control valve interacts with at least one compressed-air sensor. A reserve-air tank can be controlled by the at least one control valve and stores the reserve air for the at least one brake cylinder. At least one compressed-air sensor arranged on the at least one control valve is connected to an energy source and a data memory having an interface for reading out data, wherein the data in the data memory contain information about a pressure level in the at least one brake cylinder.

15 Claims, 1 Drawing Sheet

(51) Int. Cl.
*B60T 13/66* (2006.01)
*B60T 13/36* (2006.01)

(56) References Cited

U.S. PATENT DOCUMENTS

| | | | |
|---|---|---|---|
| 7,468,564 B2 * | 12/2008 | Crisafulli | H02K 7/1823 |
| | | | 290/43 |
| 8,543,305 B2 | 9/2013 | Heise et al. | |
| 8,674,534 B2 * | 3/2014 | Bodnar, Jr. | B60T 17/22 |
| | | | 290/43 |
| 9,352,736 B2 | 5/2016 | Mayer | |
| 2006/0048566 A1 | 3/2006 | Hawthorne et al. | |
| 2009/0200865 A1 | 8/2009 | Grossner et al. | |

FOREIGN PATENT DOCUMENTS

| | | |
|---|---|---|
| DE | 60223291 T2 | 8/2008 |
| DE | 102007024310 A1 | 11/2008 |
| DE | 102010005091 A1 | 7/2011 |
| DE | 102011113083 A1 | 3/2013 |
| DE | 202012012558 U1 | 5/2013 |
| DE | 102012004892 A1 | 9/2013 |
| DE | 102012009427 A1 | 11/2013 |
| EP | 1541436 B1 | 10/2007 |
| WO | 2010058458 A1 | 5/2010 |

\* cited by examiner

COMPRESSED-AIR BRAKE ASSEMBLY FOR A RAIL VEHICLE

CROSS REFERENCE

This patent application is a U.S. National Phase of International Patent Application No. PCT/EP2015/054799, filed Mar. 9, 2015, which claims priority to German Patent Application 10 2014 103 84, filed on Mar. 20, 2014 the disclosures of which are incorporated herein by reference in their entirety.

FIELD

The disclosed embodiments relate to a compressed-air brake assembly for a rail vehicle, comprising at least one brake cylinder for generating a pressing force for a friction brake, wherein at least one control valve forms a corresponding brake-cylinder pressure in accordance with a pressure in a main airline, which brake-cylinder pressure is conducted to the at least one brake cylinder via a line arranged between the at least one control valve and the at least one brake cylinder, wherein the at least one control valve interacts with at least one compressed-air sensor, wherein in addition a supply air vessel can be actuated by means of the at least one control valve, and stores the supply air for the at least one brake cylinder.

The disclosed embodiments applies mainly to compressed-air brake assemblies having at least one control valve for at least one indirectly acting compressed-air brake of a rail vehicle.

BACKGROUND

Control valves are pneumatic devices which perform open-loop or closed-loop control of the pressure in the brake cylinders in accordance with the pressure in a main air line. In the case of indirectly acting compressed air brakes, the brake cylinders are vented if the main air line is filled to its regulating operating pressure. A brake cylinder pressure is generated up to a maximum value triggered by the drop in the pressure in the main air line and as a function of the magnitude of the drop. Compressed air from a supply air vessel is used for this purpose.

SUMMARY

Presently disclosed embodiments provide a compressed-air brake assembly which overcomes the abovementioned disadvantages and ensures reliable operation of the compressed-air brake assembly, in particular of the at least one control valve, with minimum expenditure on maintenance and servicing. This is achieved based on a compressed-air brake assembly according to the disclosed embodiments in conjunction with their features.

BRIEF DESCRIPTION OF THE DRAWINGS

Disclosed embodiments are explained more specifically below with reference to the accompanying drawings, in which.

DETAILED DESCRIPTION

Figure 1:
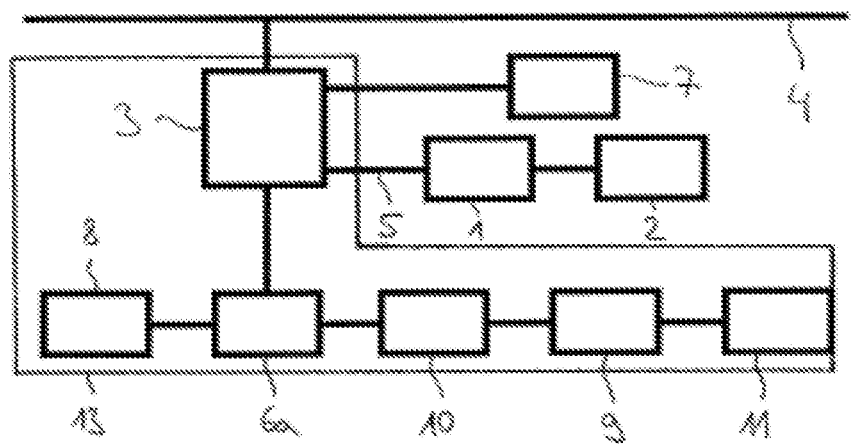
FIG. 1 shows a block illustration of the inventive compressed-air brake assembly according to a first exemplary embodiment.

According to the disclosed embodiments, the at least one compressed-air sensor is arranged on the at least one control valve or on the line formed between the at least one control valve and the at least one brake cylinder. In this context, the at least one compressed-air sensor is connected, on the one hand, to an energy source for the energy supply and, on the other hand, is connected for the purpose of data storage, to a data memory having an interface for reading out data, wherein the data which is stored in the data memory have at least one item of information about a pressure level in the at least one pressure cylinder. In other words, the at least one compressed-air sensor can both be integrated in the housing of the control valve, together with the energy source and the data memory with an interface, and also be arranged on the outside of the housing of the control valve. When the compressed-air sensor with an energy source, data memory and interface is arranged on the line which is formed between the control valve and the at least one brake cylinder, in particular a connecting duct is provided between the line and the at least one compressed-air sensor. How often the brake cylinder pressure has assumed certain values is apparent from the at least one item of information about the pressure in the at least one brake cylinder.

The stored data can be read out, via the interface, from an electronic reading and evaluating unit which has software for evaluating data. The stored data can be read out on a regular basis or when required. The software contains, in particular, information about the behavior according to regulations, and about the normal behavior, of the at least one control valve. According to the regulations the maximum brake-cylinder pressure should be in a specific interval. In this context, the rated value is 3.8 bar, and the tolerance +/−0.1 bar. As a rule, the brake-cylinder pressure has the value 0 in extended phases of travel of the rail vehicle. The brake-cylinder pressure of the vehicle which is stopped with full braking is maintained for a specific time, which is determined by the tightness of the system. It is therefore possible to acquire information as to whether the at least one control valve is operating according to regulations, how frequently it has been in action since it was last reconditioned, and how the state is to be assessed compared to a normal state of a statistically relevant quantity. It is therefore possible to find control valves in which their tightness or the tightness of the adjacent elements of the brake system or other parameters already tend in the direction of a failure criterion. Likewise, it is also possible to find control valves which have transient faults, are already difficult to move or which have executed a high number of braking cycles and release cycles so that they should be reconditioned shortly.

Furthermore, the stored data may comprise a multiplicity of braking cycles and release cycles of the at least one brake cylinder. The determined braking cycles and release cycles serve to determine information about the state of the at least one control valve and other components of the compressed-air brake assembly and to signal said information.

The interface comprises a transponder which is connected to the electronic reading and evaluating unit for the cableless transmission of the stored data by means of electromagnetic waves. The electronic reading and evaluating unit is advantageously not arranged on the rail vehicle, with the result that a transmission of data to the reading and evaluating unit can be implemented without a fixed connection. The transponder is embodied as an RFID transponder.

According to one embodiment, the electronic reading and evaluating unit is arranged directly on the interface for evaluating the data and displaying three different states. In particular, the states "satisfactory", "caution" or "need for action" are diagnosed and made available. As a result, the signal can be detected as the rail vehicle passes by and the rail road operation actions can be initiated as required.

At least one second compressed-air sensor for determining the pressure is arranged in the main airline. The second compressed-air sensor is, like the first compressed-air sensor, also connected to the energy source and the data memory. As a result, in particular a setpoint/actual comparison of the relationship between the pressure in the main air line and the pressure in the brake cylinder can be carried out by the reading and evaluating unit, as a result of which the state of the control valve can be diagnosed even more precisely.

According to one embodiment, the energy source comprises a micro-turbine which, in the event of a change in pressure, uses the flowing air to generate energy for the at least one compressed-air sensor and a data storage means. In other words, the micro-turbine of the energy source is driven by the flowing air and generates the necessary energy for the at least one compressed-air sensor and the data memory, with the result that the information generated by the compressed-air sensor can be stored in the data memory. As a result it is possible both to save energy and to dispense with an energy accumulator.

According to a further embodiment, the energy source comprises a pressure/electricity transformer which has at least one face on which a change in pressure acts in order to generate energy. It is also conceivable for the energy source to comprise an energy accumulator. A combination of an energy generator and an energy store is also conceivable.

According to FIG. 1, the compressed-air brake assembly for a rail vehicle comprises a brake cylinder 1 for generating a pressing force for a friction brake 2, wherein a control valve 3 forms a corresponding brake cylinder pressure in accordance with a pressure in a main air line 4. In addition, a supply air vessel 7 is connected to the control valve 3 and can also be actuated thereby. The supply air vessel 7 stores the supply air for the bake cylinder 1. Together with the control valve 3, a compressed-air sensor 6a and an energy source 8, a data memory 10 with an interface 9 and an electronic reading and evaluating unit 11 are arranged in a common housing 13. In other words, the parts mentioned above are arranged as one unit in a common housing 13 with the control valve 3.

The energy source 8 has a micro-turbine (not illustrated here) which, in the case of a change of pressure, uses the flowing air to generate energy for the compressed-air sensor 6a and the data memory 10, without consuming air additionally. The compressed-air sensor 6a stores the generated information about the pressure level in the brake cylinder 1 in the data memory 10. This stored data can be read out, via the interface 9, from the electronic reading and evaluating unit 11. The reading and evaluating unit 11 has software for evaluating the data and displaying three different states, specifically "satisfactory", "caution" or "need for action". In addition, the stored data comprise a multiplicity of braking and release cycles of the brake cylinder 1.

Figure 2:
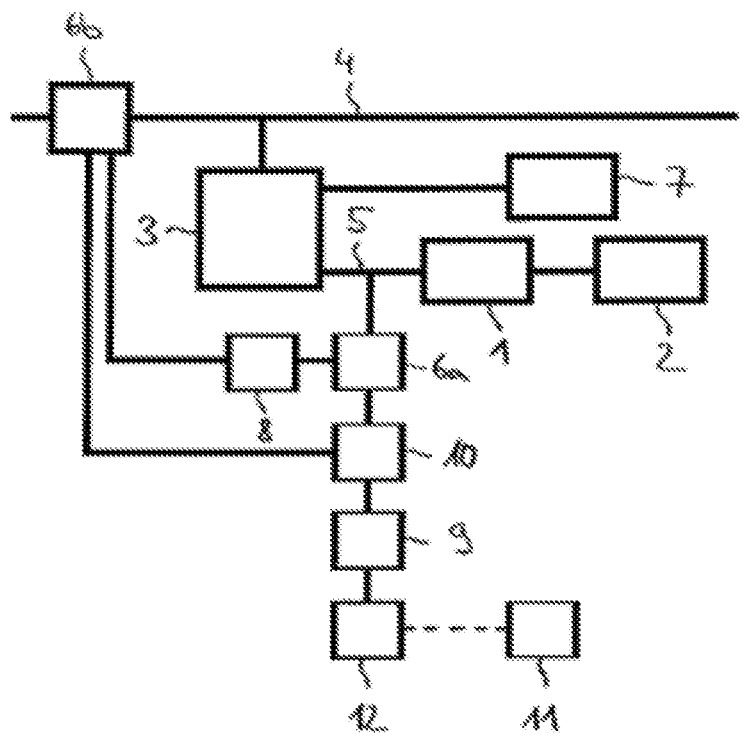
FIG. 2 shows a block illustration of the inventive compressed-air brake assembly according to a second exemplary embodiment.

According to FIG. 2, the compressed-air brake assembly has a first cylinder 6a which is formed on a line 5 arranged between the control valve 3 and the brake cylinder 1. Furthermore, a second compressed-air sensor 6b for determining the pressure is arranged in the main air line 4. The energy source 8 supplies electrical energy both to the first compressed-air sensor 6a and to the second compressed-air sensor 6b. Furthermore, the energy source 8 also makes available the necessary electrical energy for the data storage means. In addition, the energy source 8 comprises a pressure/electricity transformer (not illustrated here) which has a face on which a change in pressure acts in order to generate energy. The two compressed-air sensors 6a and 6b are connected to the data memory 10 in order to store the information which is generated by the compressed-air sensors 6a and 6b. In addition, the data memory 10 has an interface 9 at which a transponder 12 is arranged. The latter is connected in a cableless fashion to the electronic reading and evaluating unit 11 via electromagnetic waves. The information which is transmitted by the transponder 12 is evaluated by the reading and evaluating unit 11.

The disclosed embodiments is not restricted to the embodiments described above. Instead, refinements thereof which are also included in the scope of protection of the following claims are also conceivable. It is therefore also possible, for example, also to use an energy store instead of an energy source 8 which comprises an energy generator. This can in the simplest case be embodied as an accumulator. Furthermore, the disclosed embodiments is not restricted to one control valve 3 or one brake cylinder 1. Instead, the compressed-air brake assembly can also comprise a multiplicity of brake cylinders and control valves.

Document DE 10 2007 024 310 A1 discloses a device and a method for assessing the compatibility of brake systems of a vehicle combination composed of a traction vehicle and a trailer vehicle. In this context, braking energy which is applied in a braking process of the trailer vehicle and a required braking energy of the braking process of the trailer vehicle are determined. A safety valve has a vessel port to which the supply pressure vessel for the trailer vehicle is connected, and a brake-pressure port to which the pneumatic brake-pressure is output to the pneumatic inlet of a pneumatic brake-pressure modulator. This brake pressure constitutes the pneumatic control pressure for the trailer vehicle with its electronic brake-pressure regulating means. According to one development the applied braking energy and the required braking energy are stored in a control unit which is present in the vehicle combination, and the applied braking energy and the required braking energy can be read out by an interface. The control unit uses for the brake pressure regulating means the pressure measured value of a pressure sensor which constitutes the brake pressure of the safety valve which is output at the brake pressure port. The electric brake control system has electronics for evaluating the sensor signals and for actuating pneumatic valves, which electronics are also components of the control system. The valves of the brake control system are connected to the brake cylinders via pneumatic lines.

Furthermore, DE 602 23 291 T2 discloses a hydraulic brake-pressure control unit. The latter has a multiplicity of electromagnetically operated hydraulic pressure control valves which are capable of controlling a pressure of the working fluid in four brake cylinders. In addition, the hydraulic brake-pressure control unit also has a master cylinder which can be activated by means of an operator in order to place the working fluid under pressure, a master cylinder pressure sensor which is operationally capable of detecting a pressure of the working fluid which is placed under pressure by the master cylinder, and a pressure accumulator pressure sensor which is operationally capable of detecting a by the working fluid which is stored in the pressure accumulator.

Because the operation of the control valves is critical for traffic safety, it is therefore subject to strict monitoring. Consequently, the brakes of the rail vehicle are checked regularly. In this context, braking is initiated and it is checked whether the brake box or braking linings come to bear and are released again after the raising of the pressure. The generally known prior art discloses the use of brake testing devices for this. Such brake testing devices can be connected via compressed air couplings. Furthermore, for safety reasons control valves are subject to scheduled maintenance. In this context, after the expiry of a time interval or a distance travelled by the rail vehicle, the control valves are disassembled from the rail vehicle and subjected to maintenance. The disadvantage of the prior art specified above, is, in particular, that the testing of a compressed-air brake assembly, in particular of the control valves, entails considerable expenditure. In addition, the maintenance supplies information only about the instantaneous state of the control valves. Furthermore, the test of the control valves can take place too late or too early owing to the predefined intervals, resulting in risks, on the one hand, and unnecessary expenditure, on the other.

LIST OF REFERENCE NUMBERS

1 Brake cylinder
2 Friction brake
3 Control valve
4 Main air line
5 Line
6a, 6b Compressed-air sensor
7 Supply air vessel
8 Energy source
9 Interface
10 Data memory
11 Reading and evaluating unit
12 Transponder
13 Housing

The invention claimed is:

1. A compressed-air brake assembly for a rail vehicle, comprising:
   at least one brake cylinder for generating a pressing force for a friction brake;
   at least one control valve forming a corresponding brake-cylinder pressure in accordance with a pressure in a main air line;
   a line arranged between the at least one control valve and the at least one brake cylinder, which conducts the brake cylinder pressure to the at least one brake cylinder;
   at least one compressed-air sensor which interacts with the at least one control valve;
   a supply air vessel actuatable by the at least one control valve and storing the supply air for the at least one brake cylinder;
   an energy source for an energy supply; and
   a data memory having an interface for reading out data,
   wherein the at least one compressed-air sensor is arranged on the at least one control valve and is connected to the energy source for the energy supply and is also connected, for the purpose of data storage, to the data memory,
   wherein the data which is stored in the data memory contain at least one item of information about a pressure level in the at least one brake cylinder, wherein the stored data comprise a multiplicity of braking and release cycles of the at least one brake cylinder, and
   wherein the stored data is read out, via the interface, from an electronic reading and evaluating unit which has software for evaluating data, the software containing at least information about control valve behavior regulations
   and
   wherein the electronic reading and evaluating unit has software for evaluating data and providing a diagnosis for the at least one control valve.

2. A compressed-air brake assembly for a rail vehicle, comprising:
   at least one brake cylinder for generating a pressing force for a friction brake;
   at least one control valve forming a corresponding brake-cylinder pressure in accordance with a pressure in a main air line;
   a line arranged between the at least one control valve and the at least one brake cylinder which conducts the brake-cylinder pressure to the at least one brake cylinder;
   at least one compressed-air sensor which interacts with the at least one control valve;
   a supply air vessel actuatable by the at least one control valve, and storing the supply air for the at least one brake cylinder;
   an energy source for an energy supply; and
   a data memory having an interface for reading out data,
   wherein the at least one compressed-air sensor is arranged on the line arranged between the at least one control valve and the at least one brake cylinder and the at least one compressed-air sensor is connected directly to the energy source for the energy supply and connected, for the purpose of data storage, to the data memory,
   wherein the data which is stored in the data memory contain at least one item of information about a pressure level in the at least one brake cylinder, information as to whether the at least one control valve is operating according to regulations, how frequently it has been in action since it was last reconditioned, and how a state is to be assessed compared to a normal state, and
   wherein the stored data is read out, via the interface, from an electronic reading and evaluating unit which has software for evaluating data and providing a diagnosis for the at least one control valve.

3. The compressed-air brake assembly of claim 1, wherein the interface comprises a transponder which is connected to the electronic reading and evaluating unit for the cableless transmission of the stored data by electromagnetic waves.

4. The compressed-air brake assembly of claim 1, wherein the electronic reading and evaluating unit is arranged directly on the interface for evaluating the data and displaying three different states.

5. The compressed-air brake assembly of claim 1, further comprising at least one second compressed air sensor for determining the pressure arranged in the main air line.

6. The compressed-air brake assembly of claim 1, wherein the energy source comprises a micro-turbine which, in response to a change in pressure, uses the flowing air to generate energy for the at least one compressed-air sensor and a data storage means.

7. The compressed-air brake assembly of claim 1, wherein the energy source comprises a pressure/electricity converter.

8. The compressed-air brake assembly of claim 1, wherein the energy source comprises an energy store.

9. The compressed-air brake assembly of claim 2, wherein the stored data is read out, via the interface, from an electronic reading and evaluating unit which has software for evaluating data.

10. The compressed-air brake assembly of claim 2, wherein the stored data comprise a multiplicity of braking and release cycles of the at least one brake cylinder.

11. The compressed-air brake assembly of claim 2, wherein the interface comprises a transponder which is connected to the electronic reading and evaluating unit for the cableless transmission of the stored data by electromagnetic waves.

12. The compressed-air brake assembly as claimed in claim 9, wherein the electronic reading and evaluating unit is arranged directly on the interface for evaluating the data and displaying three different states.

13. The compressed-air brake assembly of claim 2, further comprising at least one second compressed air sensor for determining the pressure arranged in the main air line.

14. The compressed-air brake assembly of claim 2, wherein the energy source comprises a pressure/electricity converter.

15. The compressed-air brake assembly of claim 2, wherein the energy source comprises an energy store.

* * * * *